United States Patent [19]
Tseng

[11] Patent Number: 5,996,640
[45] Date of Patent: Dec. 7, 1999

[54] DIY FLEXIBLE PIPE WITH RIGIDITY

[76] Inventor: Shao-Chien Tseng, No. 130 Sec 2. Yang-Shin Rd., Yang-Mei Taoyuan 326, Taiwan

[21] Appl. No.: 09/083,633

[22] Filed: May 22, 1998

[51] Int. Cl.$^6$ .................................................. F16L 11/00
[52] U.S. Cl. ......................... 138/119; 138/120; 138/155; 138/172; 138/DIG. 8
[58] Field of Search ..................................... 138/108, 112, 138/117, 118, 119, 120, 134, 155, 172, DIG. 8

[56] References Cited

U.S. PATENT DOCUMENTS

| | | | |
|---|---|---|---|
| 1,935,999 | 11/1933 | Tessky | 138/108 |
| 2,460,201 | 1/1949 | Trump et al. | 138/155 |
| 4,790,294 | 12/1988 | Allred, III et al. | 138/120 |
| 4,796,607 | 1/1989 | Allred, III et al. | 138/120 |
| 4,911,206 | 3/1990 | Gropp et al. | 138/172 |
| 5,176,126 | 1/1993 | Chikama | 138/120 |
| 5,203,380 | 4/1993 | Chikama | 138/118 |

*Primary Examiner*—James F. Hook
*Attorney, Agent, or Firm*—Pro-Techtor International Services

[57] ABSTRACT

A DIY flexible pipe with rigidity comprising a screw typed inner spring sheet, a screw typed outer spring member, a plurality of spring strips, a soft sleeve and many smaller sleeves; wherein, each layer (thread) of the inner spring sheet is provided with many engaging holes for insertion therein the spring strips having engaging teeth, the spring strips string multiple layers of the inner spring sheet, each spring strip in the layers of the inner spring sheet can also be strung up with many smaller sleeves, the inner spring sheet is slipped over with the outer spring member, and the soft sleeve is slipped over the outer spring member; thereby, a user can press to and fro on the pipe gradually as he likes to make a three-dimensional pipe having the curvatures desired, the spring strips, outer spring member and inner spring sheet in the areas bended are engaged with one another to construct a state which is provided with rigidity for bearing loading, or are mutually released to render the pipe to obtain flexibility in favor of adjustment and control in bending to form a shape, the pipe thus obtains an object of bending it in a simple and easy way and making it with fixed three-dimensional bending curvatures. Such pipe can afford making of bending pipe handicrafts or be used as a supporting pipe on a spine correction device.

4 Claims, 8 Drawing Sheets

DIY FLEXIBLE PIPE WITH RIGIDITY

BACKGROUND OF THE INVENTION

1. Field of the Invention

The present invention is related to a DIY flexible pipe with rigidity, the pipe is different from a common soft bended pipe, and can be bended by a user into any desired three-dimensional arciform shape, and after bending to form a fixed shape, it keeps rigidity and stores the bending pressure, therefore it can bear loading, and can be made an exhibited stand having a three-dimensional artistic shape, a decorative framework, a handicraft bending pipe or a supporting pipe for a spine correction device etc., this can manifest the practicability and convenience in bending various three-dimensional arciform pipes in a DIY mode.

2. Description of the Prior Art

Conventional adjustable bended pipe products mostly are made from soft plastic pipes or screw typed soft pipes, they normally are used in bearing light loading which are, for example, general stands for desk lamps or water cooling pipes on a working table of a machine, and they are able of being bended randomly to have an arciform shape of any curvatures; however, capability of bearing loading of such conventional adjustable bended pipe products is extremely limited, yet accuracy and stability of the curvatures after adjusting and shaping are inferior, merely adjustment without requirement of accuracy can be done, i.e., as to the conventional adjustable soft pipes, capability of bearing loading, obtaining accuracy and stability of the curvatures etc. are impropable to be accomplished technically.

Besides, in the arts of indoor decoration and artistic creation, people mostly make daily necessities or handicrafts three-dimensional art works, so that they can have exquisite curves of unique styles, however, selection of material is extremely troublesome by virtue that a three-dimensional drawing which can be deliberated and drawn always is hard to be practised in manufacturing, or that the cost for manufacturing is too high to complete, the reason of these is that conventional material is hard to both have the capability of being moulded and shaped and the strength required, so that the hand-made artistic articles are more difficult to become three-dimensional art works; examples are stands of exhibited comodities, clothes hangering pipes, desk stands, chair legs or decorative frameworks made from metal pipes, plastic pipes or wooden pipes etc., these conventional pipes basically shall have the capability of bearing loading, and shall be extremely stable after being shaped, while the capability of being moulded and shaped is limited; the basic conventional material is unable to be adjusted for recovering their original shapes or changing to some other shapes after having been shaped, the shaped pipes can not used for other purposes, in other words, after shaped by moulding, a user, an art creating technician or an indoor decoration designer can no more able to bend and adjust the three-dimensional curvature thereof, this is the disadvantage resided in the pipes.

Further, supporting pipes used on conventional spine correction devices are made of steel pipes and made for the required amount of correction in pursuance of the length and deformation degree of a spine, while the length and deformation degree of a spine for every patient can be various, therefore, supporting pipes used on the conventional spine correction devices presently must be made according to the measure of the body of a patient, or alternatively to make in advance supporting pipes for various lengths and deformation degrees of spines ready for the patients requiring them; however, in this way, the supporting pipes for the conventional spine correction devices can not be generalized, and are cost high, yet available material may seriously wasted.

SUMMARY OF THE INVENTION

In view of the above stated background, it is the point and the primary object of the present invention to provide a rigid pipe which can be bended randomly to have a fixed shape; to achieve this object, the technical measures and the characteristics of the present invention are as follows:

1. By using an inner spring sheet, an outer spring member and a plurality of spring strips as the members of the main skeleton of the pipe structure, by the flexibility of the springs, simplicity in making bended pipe with hands can be increased, and after shaping of the bended pipe, rigidity of the pipe can be increased by the pressure of the springs stored in the members of the skeleton.

2. When in press bending the pipe with hands, the inner spring sheet, the outer spring member and the spring strips press one another to render the elastic engaging leaves at a plurality of engaging holes on the inner spring sheet to be engaged in engaging thread teeth having the cross-sections of saw teeth, so that the inner spring sheet and the spring strips can restrain mutually within predetermined areas and can have the effect of supporting and restraining the outer spring member, and the pipe can be randomly bended with hands and fixed to have the desired curvatures.

3. When it is required to change curvatures of bending of the pipe, it needs only to exert force by hands to gradually bend the areas of the pipe to be shaped, the springs can make the engaging portions displace by extension and compression thereof, so that the inner spring sheet, the outer spring member and the spring strips mutually engaged originally are released mutually now, and curvatures and orientations of the bended pipe can be controlled and adjusted for changing randomly by moulding with hands of a user, hence convenience in bending the pipe in a DIY mode can be obtained.

4. A PU pipe, PVC pipe, stainless network pipe or nylon network pipe can be made a soft sleeve to be used as a protecting player of the screw typed outer spring member, the pitch spaces resulted by extension and compression of the outer spring member in bending shaping can be covered by it, the sleeve can be applied with desired colors to endue the appearance of the pipe of the present invention with smooth curvatures and beauty.

5. Metal pipes or nylon pipes can be used to make a plurality of smaller sleeves, they can be movably slipped over the spring strips to be functioned as stop members for spacing the multiple layers of the inner spring sheet; the amount of the spaced multiple layers of inner spring sheet in the whole pipe of the present invention can be controlled by controlling the length of the smaller sleeves to be strung up, so that the flexural strength in bending and the rigidity after bending of the pipe can be under control.

Accordingly, the flexible DIY pipes with rigidity provided by the present invention can surely render the present invention to obtain the object of bending the pipes in a simple and easy way and making pipes with fixed three-dimensional bending curvatures, and more, the pipes can be bended into three-dimensional shapes with rigidity, thereby they can afford manufacturing of handicrafts to be loaded, or can be used as supports for a spine correction device.

The present invention will be apparent after reading the detailed description of the preferred embodiment thereof in reference to the accompanying drawings.

DETAILED DESCRIPTION OF THE PREFERRED EMBODIMENT

Figure 1:
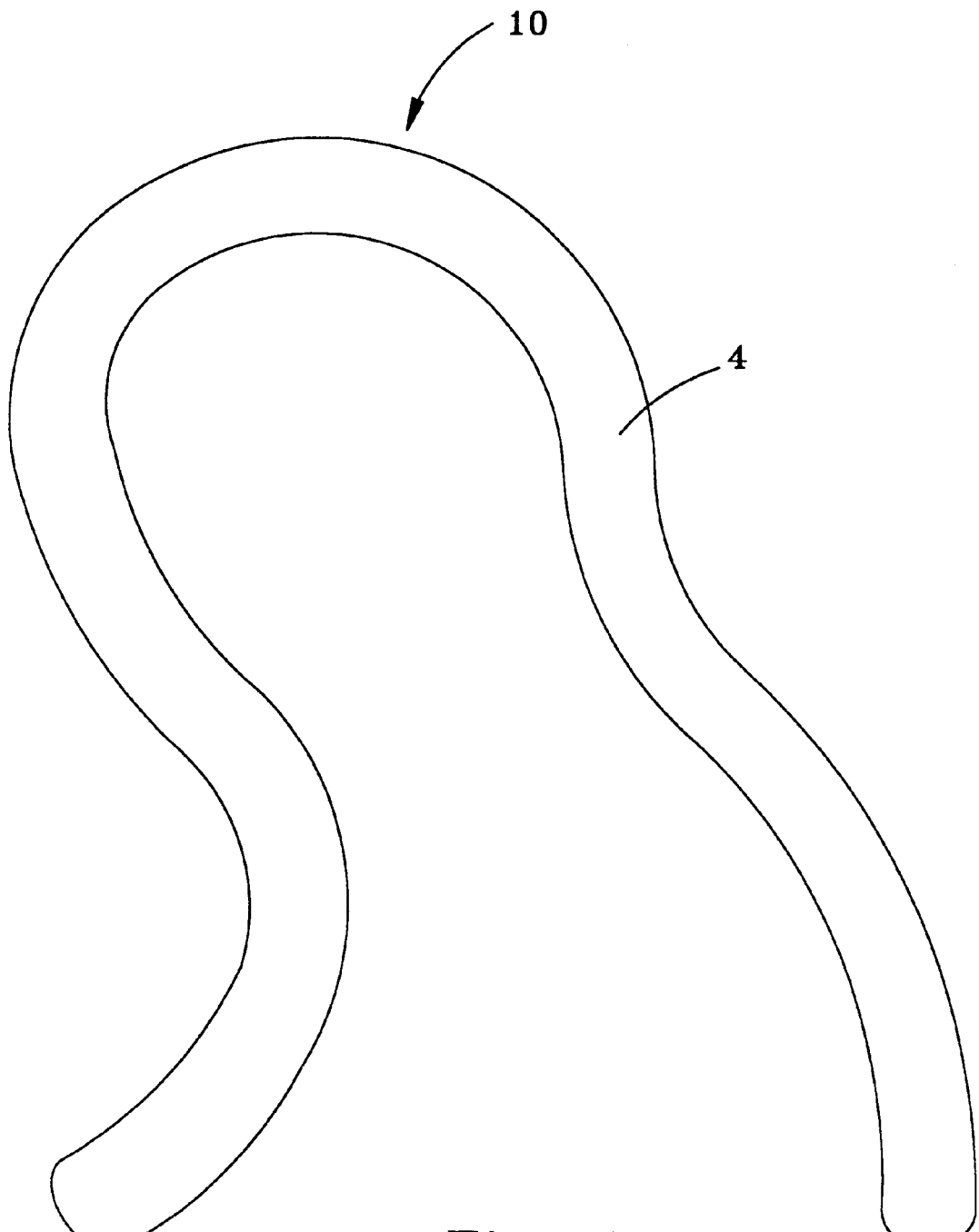
FIG. 1 is a schematic perspective view of a pipe of the present invention being bended to form a three-dimensional shape.
Figure 2:
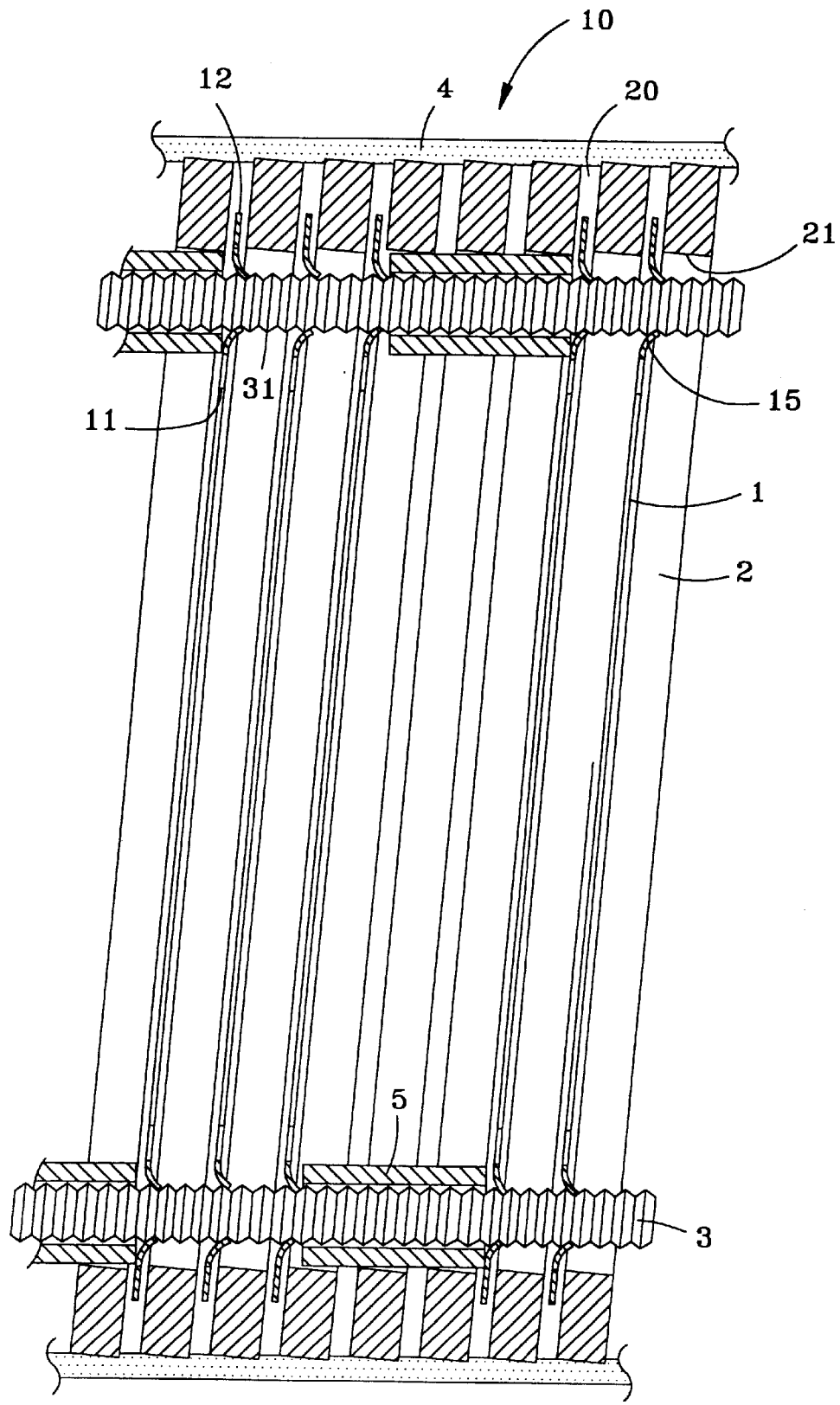
FIG. 2 is a partial enlarged sectional view of the pipe of the present invention.
Figure 3:
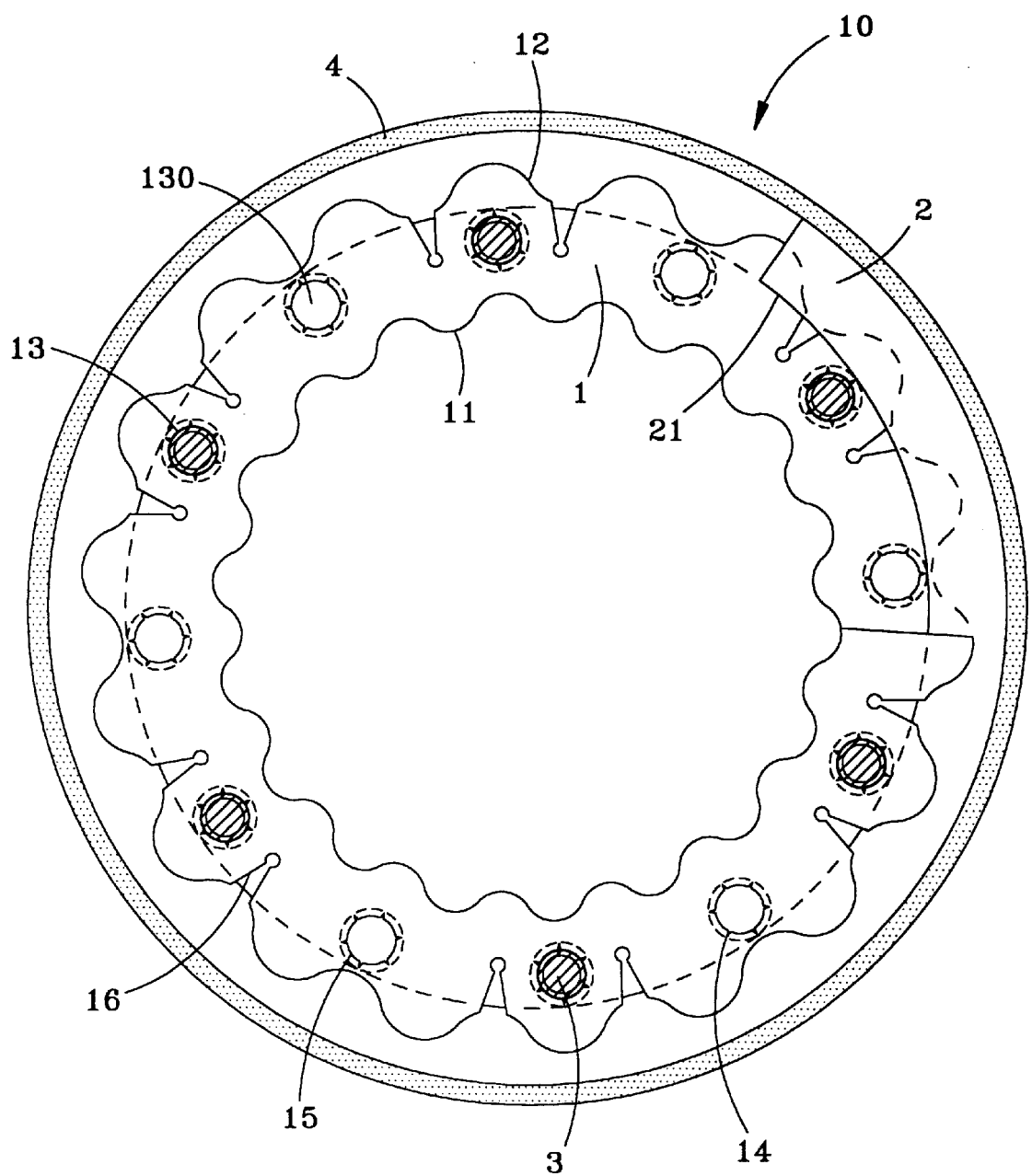
FIG. 3 is an enlarged sectional view of a cross-section of the pipe of the present invention.
Figure 4:
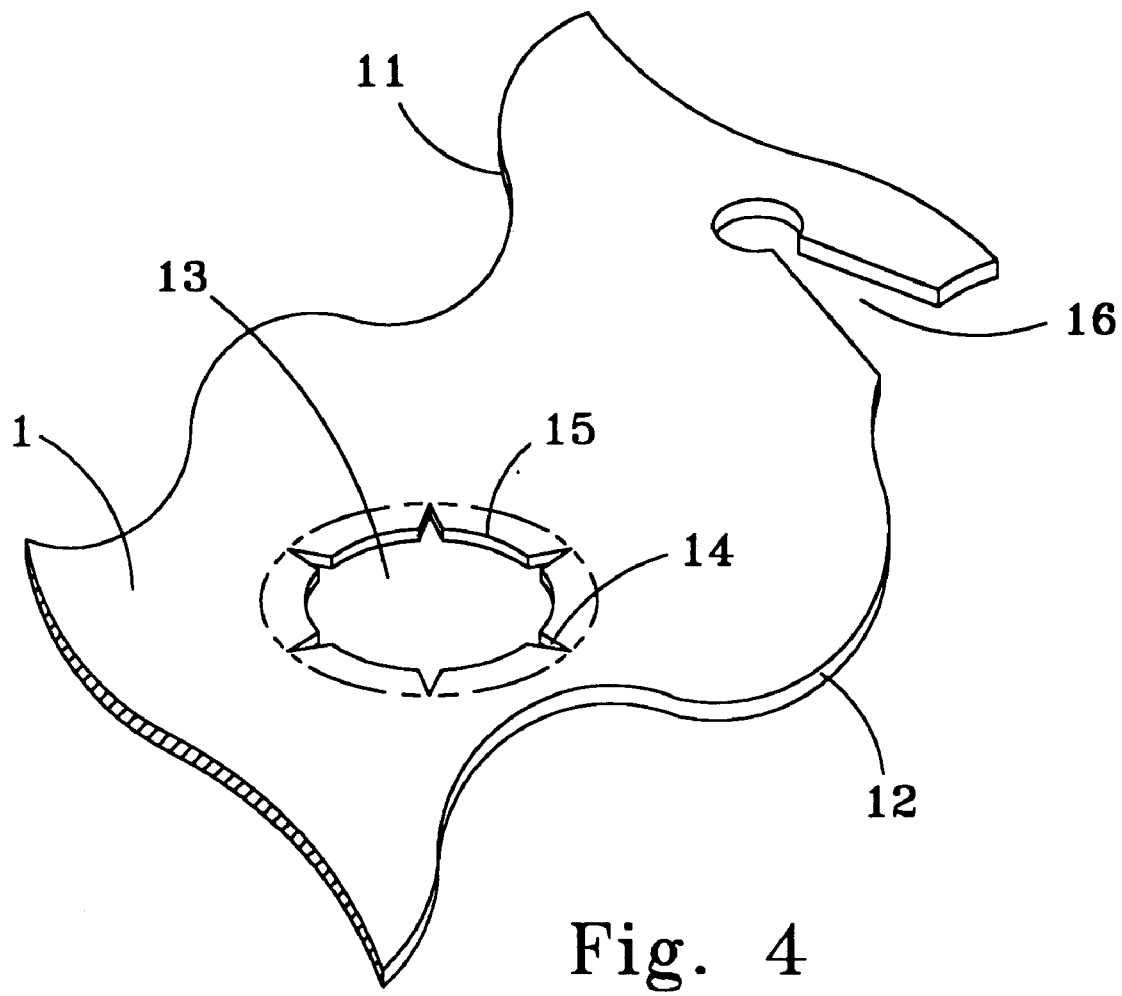
FIG. 4 is an enlarged schematic view of an engaging hole of an inner spring sheet of the present invention.

Referring to FIGS. 1 to 3, a rigid but flexible DIY pipe 10 is provided in the present invention and is comprised of a screw typed inner spring sheet 1, a screw typed outer spring member 2, a plurality of spring strips 3, a soft sleeve 4 and a plurality of smaller sleeves 5;

Wherein, the coross-sections of the annular threads of the inner spring sheet 1 are rectangular (as shown in FIG. 2), and the inner annular edge 11 of and the outer annular edge 12 of the inner spring sheet 1 are made uniformly undulated respectively, the undulated annular outer edge 12 is provided with a plurality of expansion slits 16 (as shown in FIG. 3), so that the inner spring sheet 1 can scatter the stress induced and increase strength of the pipe, the undulated annular outer edge 12 is slipped over the outer spring member 2 and their pitch spaces 20 (referring to FIGS. 2 and 3); the inner spring sheet 1 is provided uniformly with a plurality of engaging holes 13, the walls of the engaging holes 13 are provided with expansion slits 14 and elastic engaging slices 15 (as shown in FIG. 4), so that the spring strips 3 can be inserted into the engaging holes 13, the spring strips 3 are used to string up multiple layers of the inner spring sheet 1.

The shanks of the spring strips 3 are provided with shaped engaging teeth 31 which are preferably made with triangular thin threads, so that movement and function of engaging and positioning between the engaging teeth 31 and the elastic engaging slices 15 (as shown in FIGS. 2 to 4) can be feasible.

As shown in FIG. 2, the screw typed outer spring member 2 is slipped over the inner spring sheet 1, the cross-sections of the threads of the outer spring member 2 are also rectangular, the inner spring sheet 1 can be inserted in the pitch spaces 20 of the outer spring member 2.

The soft sleeve 4 is slipped over the outer spring member 2, it can be bended randomly and can be made from a PU pipe, PVC pipe, stainless network pipe or nylon network pipe, to be used as protecting player of the screw typed outer spring member 2, the pitch spaces resulted by extension and compression of the outer spring member 2 in bending shaping can be covered by it, the sleeve 4 can be applied with desired colors to endue the appearance of the pipe 10 with smooth curvatures and beauty (referring to FIGS. 2 and 3).

The smaller sleeves 5 are movably slipped over the spring strips 3 to be functioned as stop members for spacing the multiple layers of the inner spring sheet 1, therefore, the smaller sleeves 5 can be made of metal such as copper, aluminum or stainless steel or of nylon (as shown in FIG. 2); and the amount of the spaced layers of the inner spring sheet 1 in the pipe 10 can be controlled by controlling the length of the smaller sleeves 5 to be strung up, so that the flexural strength in bending and the rigidity after bending of the pipe 10 can be under control.

By composing the above mentioned members, the rigid but flexible DIY pipe 10 of the present invention can be completed.

Before a user exertes a force to bend the pipe 10 (as shown in FIG. 2), the elastic engaging slices 15 at the engaging holes 13 of the inner spring sheets 1 can be elastically extended outwardly and retracted backwardly, and can be engaged in the engaging teeth 31 of the spring strips 3, in this state, the spring strips 3, the outer spring member 2 and the inner spring sheet 1 are in a relationship wherein they are elastically and flexibly bendable and mutually loosely press one another, in order that the user can press and bend to and fro to make a three-dimensional rigid pipe 10 (as shown in FIG. 1).

Figure 5:
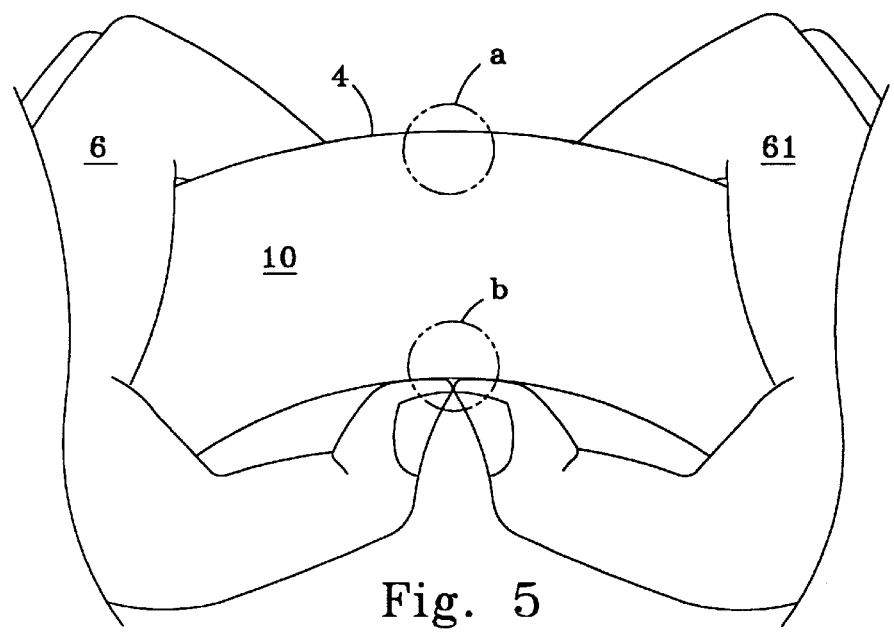
FIG. 5 is a partial sectional view showing press bending of the pipe of the present invention into a fixed shape with hands.
Figure 6:
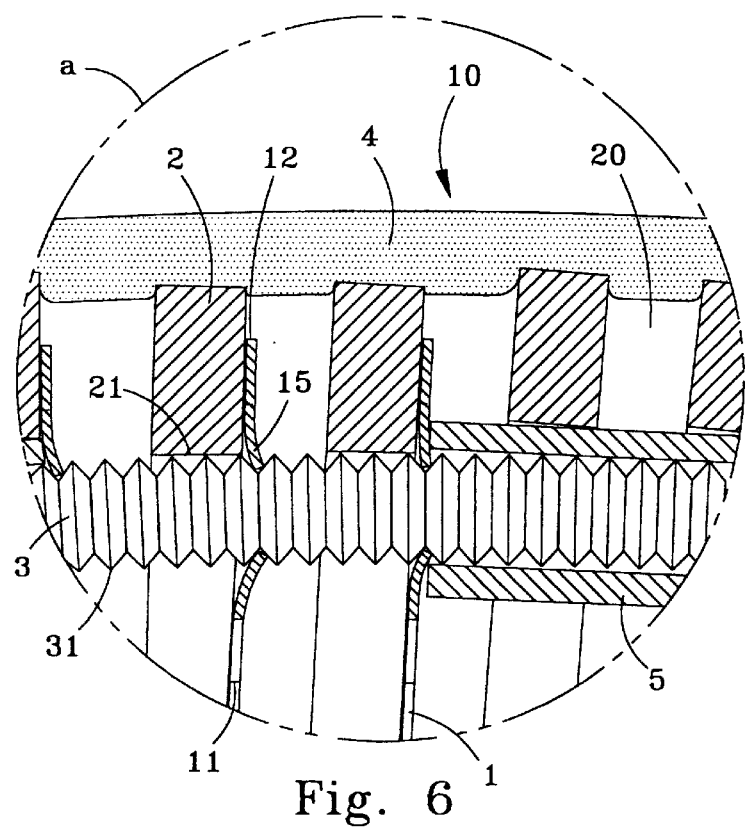
FIG. 6 is an enlarged schematic view of the "a" portion in FIG. 5.
Figure 7:
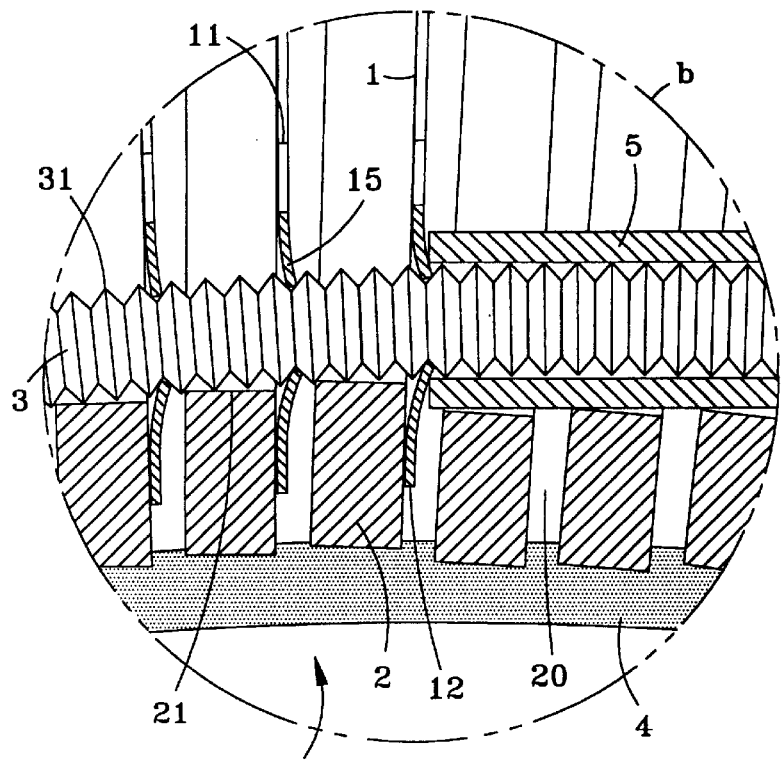
FIG. 7 is an enlarged schematic view of the "b" portion in FIG. 5.
Figure 8:
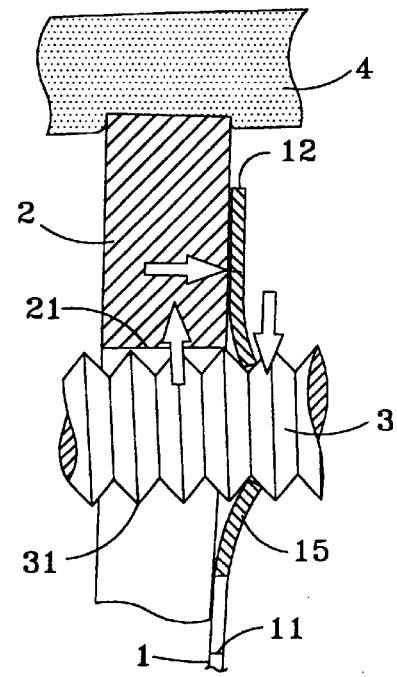
FIG. 8 is a schematic view showing a layer of the inner spring sheet, the outer spring member and the spring strips of the present invention press one another.

When the user exerts force to and fro on the pipe 10. for bending, (as shown in FIG. 5), the spring strips 3, the outer spring member 2 and the inner spring sheet 1 in the bended portions of the pipe 10 will press elastically one another (as shown in FIG. 8), so that the elastic engaging slices 15 provided at the engaging holes 13 of the inner spring sheet 1 and bevelly engaging with the spring strips 3 can gradually extend outwardly by bending of the spring strips 3, and the engaging slices 15 then restore their approximately straight state from the elastic bevel extending state, and this can make the engaging teeth 31 of the spring strips 3 restrained in positions, the annular inner spring sheet 1 restrained in position by the spring strips 3 also restrains the outer spring member 2 in the pitch spaces 20, and the inner wall 21 of the bended outer spring member 2 is also contacted with and restrained by the bended spring strips 3, so that the spring strips 3, the outer spring member 2 and the inner spring sheet 1 mutually restrain when the pipe 10 is in the bending state as shown in FIGS. 6 and 7, and therefore, the user can press to and fro on the pipe 10 as he likes, to make the three-dimensional pipe 10 have the curvatures desired (as shown in FIG. 1), the pipe 10 can be fixed in any curvature during bending, and the bending areas of the pipe 10 can store pressure in the springs and thereby is provided with rigidity.

Figure 9:
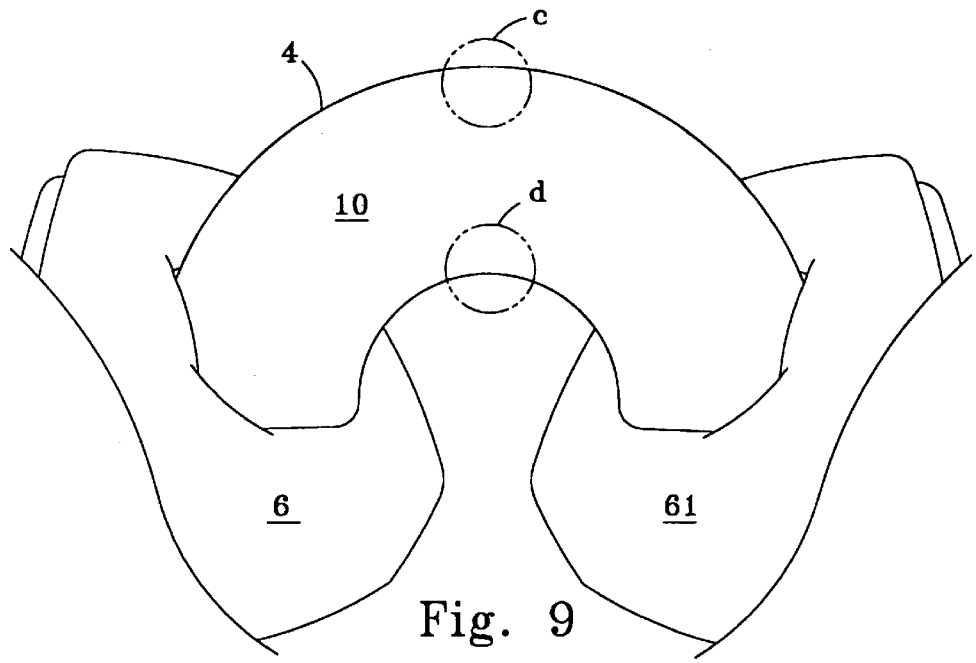
FIG. 9 is a partial sectional view showing the pipe is once more bended to restore its original position.
Figure 10:
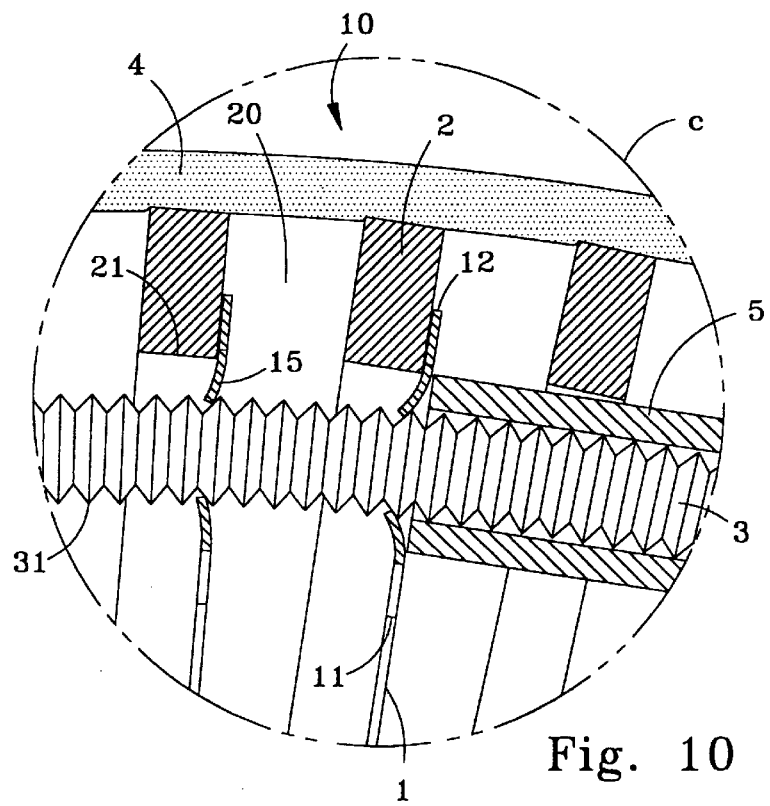
FIG. 10 is an enlarged schematic view of the "c" portion in FIG. 9.
Figure 11:
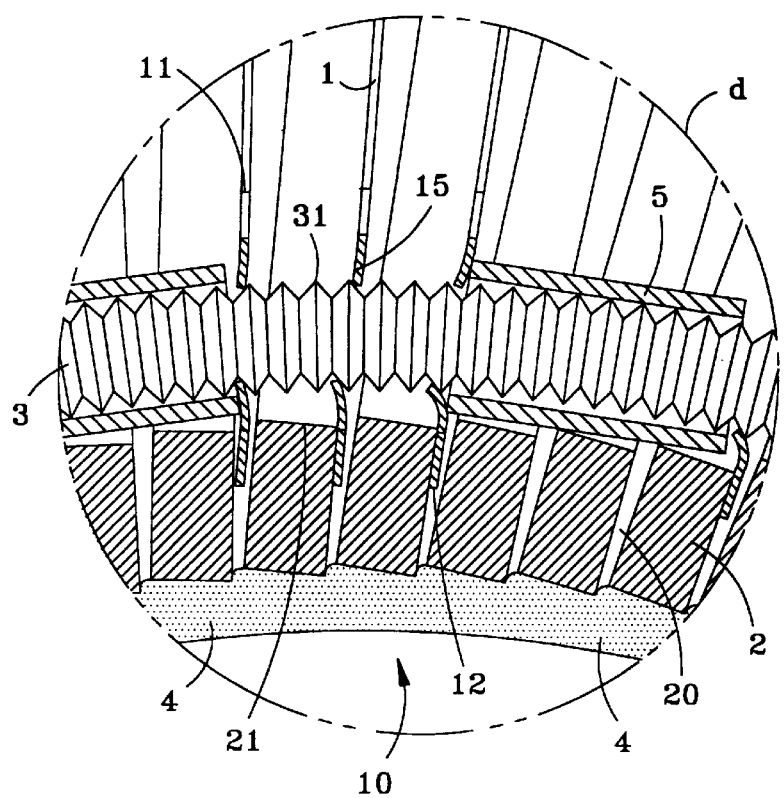
FIG. 11 is an enlarged schematic view of the "d" portion in FIG. 9.
Figure 12:
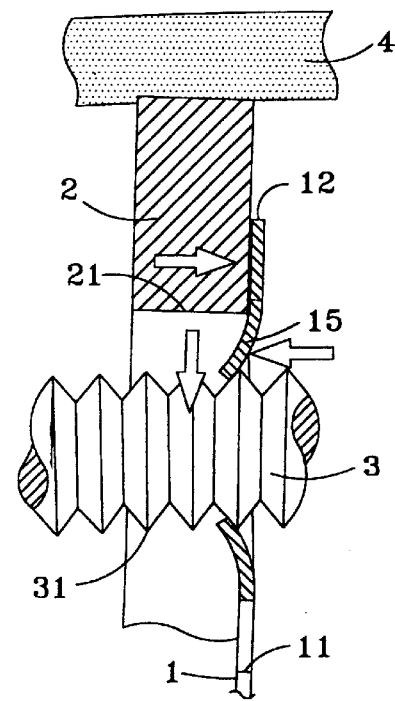
FIG. 12 is a schematic view showing the inner spring sheet, the outer spring member and spring strips of the present invention press one another.

Further, when it is required to change curvatures of the pipe 10, just exert force again at the areas to be bended on the pipe (as shown in FIG. 9), the engaging slices 15 at the engaging holes 13 of the inner spring sheets 1 can be once more pressed to elastically extend outwardly (as shown in FIG. 12) by the force of the spring strips 3, the outer spring member 2 and the inner spring sheet 1 to thereby release the spring strips 3 and the outer spring member 2 (as shown in FIGS. 10 and 11), and the user can press other areas of the pipe 10 with hands 6 and 61, so that the curvatures and orientations of bending of the pipe 10 can be randomly adjusted and controlled, and convenience of bending the pipe 10 by the DIY mode can be obtained.

In practising of the present invention, the engaging holes 13 of the annular inner spring sheet 1 are alternately extended through and not extended through by the spring strips 3, so that some engaging holes (distinctively marked with a number 130) are left blank without extending therethrough any spring strip 3 (as shown in FIG. 3), this is for connecting other pipes to obtain a longer pipe set with a predetermined length.

Accordingly, when in using, the pipe of the present invention can be partially bended gradually to a fixed shape having three-dimensional curvatures, and the whole pipe can keep in having an excellent rigidity after bending for shaping, therefore, such a pipe can be used as a basic material to be directly bended with hands in a DIY mode in making a bending pipe with a desired loading capability, and it is extremely suitable for being a supporting pipe for a spine correction device, so that when the pipe is bended to form the curvatures required by the spine supporting pipe, the whole pipe can keep the rigidity required for supporting the back of a person.

Having now particularly described and ascertained the technical structure of my invention with practicability and improveness and in what manner the same is to be performed, what I claim will be declared in the claims followed.

I claim:

1. A DIY flexible pipe with rigidity comprised of a screw typed inner spring sheet, a screw typed outer spring member, a plurality of spring strips, a soft sleeve and a plurality of smaller sleeves; wherein, said soft sleeve is slipped over said outer spring member to be used as protecting layer of said screw typed outer spring member, said pipe is characterized in that:

an inner annular edge and an outer annular edge of said inner spring sheet are made uniformly undulated respectively, said undulated annular outer edge is provided with a plurality of expansion slits, layers of said inner spring sheet are inserted in the pitch spaces of said outer spring member, said inner spring sheet is provided uniformly with a plurality of engaging holes, the walls of the engaging holes are provided with other expansion slits and elastic engaging slices, so that said spring strips can be inserted into said engaging holes, said spring strips are used to string up said layers of said inner spring sheet;

the shanks of said spring strips are provided with shaped engaging teeth, so that said engaging holes can be engaged with said elastic engaging slices;

said smaller sleeves are movably slipped over said spring strips to be functioned as stop members for spacing said layers of said inner spring sheet;

by composing said springs and sleeves, a user can press to and fro on said pipe gradually as he likes, to make a three-dimensional pipe having the curvatures desired, said spring strips, outer spring member and inner spring sheet in the areas bended are engaged with one another to construct a state which is provided with rigidity for bearing loading, or are mutually released to render said pipe to obtain flexibility in favor of adjustment and control in bending to form a shape, said pipe thus obtains an object of bending said pipe in a simple and easy way and making said pipe with fixed three-dimensional bending curvatures.

2. A DIY flexible pipe with rigidity as claimed in claim 1, wherein, cross-sections of threads of said inner spring sheet and said outer spring member are rectangular.

3. A DIY flexible pipe with rigidity as claimed in claim 1, wherein, said engaging teeth are preferably made with triangular thin threads, so that movement and function of engaging and positioning between said engaging teeth and said elastic engaging slices are feasible.

4. A DIY flexible pipe with rigidity as claimed in claim 1, wherein, said engaging holes of said annular inner spring sheet are alternately extended through and not extended through by said spring strips, said engaging holes not extended through are for connecting other pipes to obtain a longer pipe set with a predetermined length.

* * * * *